United States Patent
Stolper

(10) Patent No.: US 10,889,362 B2
(45) Date of Patent: Jan. 12, 2021

(54) STRUT MOUNTED GEAR BOX FOR COUNTER ROTATING PROPELLERS

(71) Applicant: Peter R. Stolper, Stuart, FL (US)

(72) Inventor: Peter R. Stolper, Stuart, FL (US)

(*) Notice: Subject to any disclaimer, the term of this patent is extended or adjusted under 35 U.S.C. 154(b) by 7 days.

(21) Appl. No.: 16/466,312

(22) PCT Filed: Jun. 22, 2017

(86) PCT No.: PCT/US2017/038692
§ 371 (c)(1),
(2) Date: Jun. 4, 2019

(87) PCT Pub. No.: WO2018/106288
PCT Pub. Date: Jun. 14, 2018

(65) Prior Publication Data
US 2020/0070944 A1    Mar. 5, 2020

Related U.S. Application Data

(60) Provisional application No. 62/431,217, filed on Dec. 7, 2016.

(51) Int. Cl.
| | | |
|---|---|---|
| *B63H 23/06* | (2006.01) | |
| *B63H 23/32* | (2006.01) | |
| *F16D 3/06* | (2006.01) | |
| *F16H 57/025* | (2012.01) | |
| *F16H 57/038* | (2012.01) | |
| *F16H 57/04* | (2010.01) | |
| *F16H 57/02* | (2012.01) | |

(52) U.S. Cl.
CPC .......... *B63H 23/06* (2013.01); *B63H 23/321* (2013.01); *F16D 3/06* (2013.01); *F16H 57/025* (2013.01); *F16H 57/038* (2013.01); *F16H 57/0495* (2013.01); *B63H 2023/067* (2013.01); *B63H 2023/323* (2013.01); *B63H 2023/325* (2013.01); *F16H 2057/02043* (2013.01)

(58) Field of Classification Search
CPC .................. B63H 23/06; B63H 23/321; B63H 2023/067; B63H 2023/323; B63H 2023/325; F16D 3/06; F16H 57/025; F16H 57/038; F16H 57/0495; F16H 2057/02043
See application file for complete search history.

(56) References Cited

U.S. PATENT DOCUMENTS

| | | |
|---|---|---|
| 4,643,687 A | 2/1987 | Yano et al. |
| 4,963,108 A | 10/1990 | Koda et al. |

(Continued)

*Primary Examiner* — Stephen P Avila
(74) *Attorney, Agent, or Firm* — McHale & Slavin, P.A.

(57) ABSTRACT

A strut mounted gear box for counter rotating propellers. The gear box is strut mounted for securement to the hull of a boat. A main input shaft is coupled to a propulsion component of a boat with a distal end secured to an idler gear cage assembly located within the gear box. The main input shaft transfers torque and rotation from the propulsion component to an idler gear cage assembly. An inner tail shaft is coupled to the main input shaft and arranged to rotate the inner tail shaft in a first direction. A counter shaft is coupled to the idler gear cage assembly and arranged to rotate the counter shaft in a second direction. A first propeller is secured to the inner tail shaft providing rotation in the first direction; and a second propeller is secured to the counter shaft allowing rotation in the second direction.

7 Claims, 1 Drawing Sheet

(56) References Cited

U.S. PATENT DOCUMENTS

| | | |
|---|---|---|
| 5,017,168 A | 5/1991 | Ackley |
| 5,083,989 A | 1/1992 | Yates et al. |
| 5,230,644 A | 7/1993 | Meisenburg et al. |
| 5,249,995 A | 10/1993 | Meisenburg et al. |
| 5,352,141 A * | 10/1994 | Shields .................. B63H 23/34 416/129 |
| 5,366,398 A | 11/1994 | Meisenburg et al. |
| 5,494,466 A | 2/1996 | Vernea |
| 5,601,464 A | 2/1997 | Ogino et al. |
| 5,890,938 A | 4/1999 | Eick et al. |
| 2008/0214068 A1 | 9/2008 | Stolper |
| 2009/0053944 A1 | 2/2009 | Hagan |
| 2015/0071780 A1 | 3/2015 | Oh et al. |

* cited by examiner

STRUT MOUNTED GEAR BOX FOR COUNTER ROTATING PROPELLERS

CROSS REFERENCE TO RELATED APPLICATIONS

This is a national stage filing in accordance with 35 U.S.C. § 371 of PCT/US2017/038692, filed Jun. 22, 2017, which claims the benefit of the priority of U.S. Provisional Patent Application No. 62/431,217, filed Dec. 7, 2016, the contents of each are incorporated herein by reference.

FIELD OF THE INVENTION

The present invention relates generally to marine propulsion systems and, in particular, to a counter rotating propeller system using a conventional transmission with a strut mounted gear case.

BACKGROUND OF THE INVENTION

Counter rotating propellers are highly desirable. Normally they are found on Outdrives, Pod Systems and Outboard Motors. Dual propellers that are counter-rotating provide a much improved level of thrust efficiency, as well as allowing the thrust path to be straight when moving forward or astern; they remove the paddle wheel effect of single propellers that force the stern of the vessel in the direction of their rotation, also called side thrust.

Known contra-rotation propeller systems include U.S. Pat. No. 5,083,989, which discloses a drive transmission having contra-rotating propeller shafts which transmit contra-rotating drives to the shaft via respective planet carriers. Particular advantages are the equal divisions of torque between the shafts and the enabling of location of thrust bearings in positions which are easy to access.

U.S. Pat. No. 5,366,398 discloses a marine dual propeller drive assembly with counter-rotating propellers. Inner and outer concentric counter-rotating propeller shafts are supported by a spool in the lower horizontal bore. Passages are provided in the housing for communicating lubrication and/or exhaust with the horizontal bore.

U.S. Pat. No. 5,601,464 discloses a transmission system for a counter-rotational propulsion device. The transmission system converts the outboard drive from a single propeller drive to a counter-rotational dual propeller system. The transmission system involves a first transmission which selectively couples an inner propulsion shaft with an existing driveshaft of the outboard drive. A second transmission of the transmission system is provided between the inner propulsion shaft and an outer propulsion shaft. The second transmission reverses the rotational drive direction input by the inner propulsion shaft so as to drive the outer propulsion shaft in an opposite rotational direction.

U.S. Pat. No. 5,230,644 discloses counter-rotating surface operating propellers. An upper adapter spool has a lower threaded outer portion mating with a threaded portion of the vertical bore of the drive housing and supporting the upper gear for rotation about the driveshaft, and supporting the driveshaft for rotation within the adapter spool. A vertical bore structure enables assembly from above the majority of the vertical train components into a one piece unitary integrally cast housing. The vertical distance between the adapter spool and the lower bearings supporting the vertical driveshaft is approximately equal to the propeller radius.

U.S. Pat. No. 4,963,108 discloses a marine counter-rotating propeller drive system. The system comprises a large gear driven by an engine, and a plurality of small gears disposed so as to respectively mesh with the large gear at a plurality of fixed positions along the circumference of the large gear. Planet gears are respectively mounted to the gear shafts of the small gears. A sun gear and an inner tooth gear are respectively meshed with the planet gears. A rear propeller is mounted to an inner shaft serving as a gear shaft of the sun gear. A front propeller is mounted to a tubular outer shaft serving as a gear shaft of the inner tooth gear.

U.S. Pat. No. 5,249,995 discloses a marine drive having two counter-rotating surfacing propellers. Inner and outer concentric counter-rotating propeller shafts are supported by a spool assembly locked and retained against rotation and against axial movement in the lower horizontal bore in the torpedo of the drive housing by axially spaced left and right hand threads. A thrust bearing assembly transfers thrust from the outer propeller shaft to the inner propeller shaft during rotation of the propeller shafts in an opposite direction, and is located between the fore and aft driven gears.

What is lacking in the prior art is a counter rotating propeller system using a conventional transmission with a strut mounted gear case.

SUMMARY OF THE INVENTION

A strut mounted gear box that allows for counter rotating propellers to be placed in a conventional manner, namely beneath the boat hull. The gear box is strut mounted for securement to the hull of a boat. The engine and transmission of the boat can be positioned in a conventional arrangement, the instant invention can even be used to retrofit existing boats. A main input shaft is coupled to the transmission of the boat with a distal end secured to an idler gear cage assembly located within the gear box. The main input shaft transfers torque and rotation from the propulsion component to an idler gear cage assembly. An inner tail shaft is coupled to the main input shaft and arranged to rotate the inner tail shaft in a first direction. A counter shaft is coupled to the idler gear cage assembly and arranged to rotate the counter shaft in a second direction. A first propeller is secured to the inner tail shaft providing rotation in the first direction; and a second propeller is secured to the counter shaft allowing rotation in the second direction.

The counter rotating propeller system of the instant invention is designed for use with boats using traditional or conventional straight fixed propeller shafts from low to very high horse power, in both pleasure use or commercial/military applications. These shafts can be angled in any orientation to comply with the parameters of the vessel design, and the design is fully scalable to meet any power requirements.

In order to eliminate two shafts turning inside each other for the full length of the shaft system fitted, this design allows the counter rotation to be achieved inside the strut barrel/gear case close to the propellers. The invention employs a single rotating shaft coupling a transmission to a gear case mounted strut beneath the vessel hull. The gear case mounted strut provides counter rotating shafts extending from the strut and directly coupling to counter rotating propellers. Doing this makes the whole system more efficient as less mechanical losses will be experienced by limiting the length of the counter rotating shafts to the strut and propeller end of the system.

Another advantage gained by achieving the counter rotation at the propeller end makes the shaft design inside the boat very simple. The design will not require special transmissions with counter rotating mechanisms built into them.

The shafts themselves will be simpler and more cost effective to produce, as well as torsionally stiffer than a shaft within shaft design.

Further this design approach allows each shaft system to use a standard gear case design where only the vertical component of the strut or shaft support bracket would need to be changed to suit the vessel and the gear case would simply bolt onto the strut bracket.

An advantage of the system is that maintenance will be much simpler and more effective to complete. The design and concept allows the complete counter rotating gear mechanism to be removed from its gear case as a complete assembly for service, maintenance or repair, without having to remove the main shaft system or strut/gear case from the vessel.

Counter rotating propellers are highly desirable, normally they are mostly found on Outdrives, Pod Systems and Outboard Motors. Dual propellers, counter rotating provide a much improved level of thrust efficiency as well as allowing the thrust path to be straight when moving forward or astern, they remove the paddle wheel effect of single propellers that force the stern of the boat in the direction of their rotation, also called side thrust.

In this particular application and for illustrative purposes, this specification is based on a highly efficient, enclosed, fully oil lubricated shaft system that is widely available on the pleasure market. This approach is considered the best and simplest approach to adding a counter rotation gearbox, but is not limited to this configuration, it can also be used with conventional exposed shaft systems or any conventional inline shaft application. The system can also be used with a shroud around the propellers thereby creating a thrustor, making it a good high thrust system for commercial use. The shroud can also pivot and provide steerage.

Thus, an objective of the invention is to eliminate having two shafts turning inside each other for the full length of the shaft system fitted, wherein the counter rotation is achieved inside the strut barrel/gear case close to the propellers. All thrust from the propellers is delivered to the main input shaft and to the transmission thrust bearing, or a separate thrust bearing assembly inside the boat. No thrust is handled by the strut.

Another objective of the invention is to teach a counter rotating propeller system that can be used from low to very high horsepower drive trains, and in both pleasure or commercial/military vessel applications.

Still another objective of the invention is to eliminate having two shafts turning inside each other for the full length of the shaft system fitted; this design allows the counter rotation to be achieved inside the strut barrel/gear case close to the propellers. No thrust is handled by the strut.

An advantage gained by achieving the counter rotation at the propeller end is that it makes the shaft design inside the vessel very simple. The design will not require special transmissions with counter rotating mechanisms built into them. The shafts themselves will be simpler and more cost effective to produce, as well as torsionally stiffer than a shaft within a shaft design.

Another advantage is that the construction and maintenance on the counter-rotating system that is mounted in the struts will be much simpler and more effective in operation.

Yet still another advantage is that the present system will increase the overall propulsive efficiency of a vessel by at least 20% over conventional systems, as well as over the previously described Outdrive, Pod or outboard versions.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
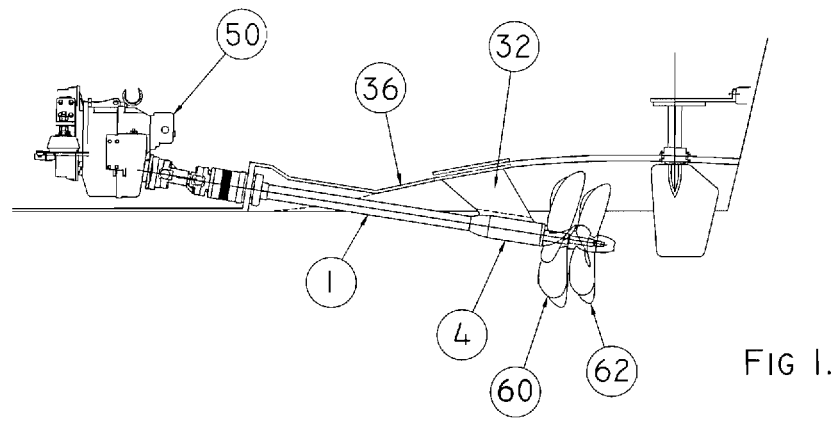
FIG. 1 is a pictorial side view of the conventional transmission coupled to the strut mounted gear case.
Figure 2:
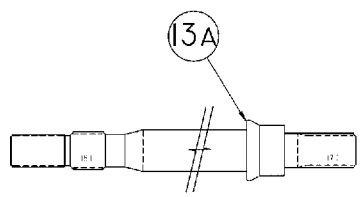
FIG. 2 is a side view of the tail shaft collar.
Figure 3:
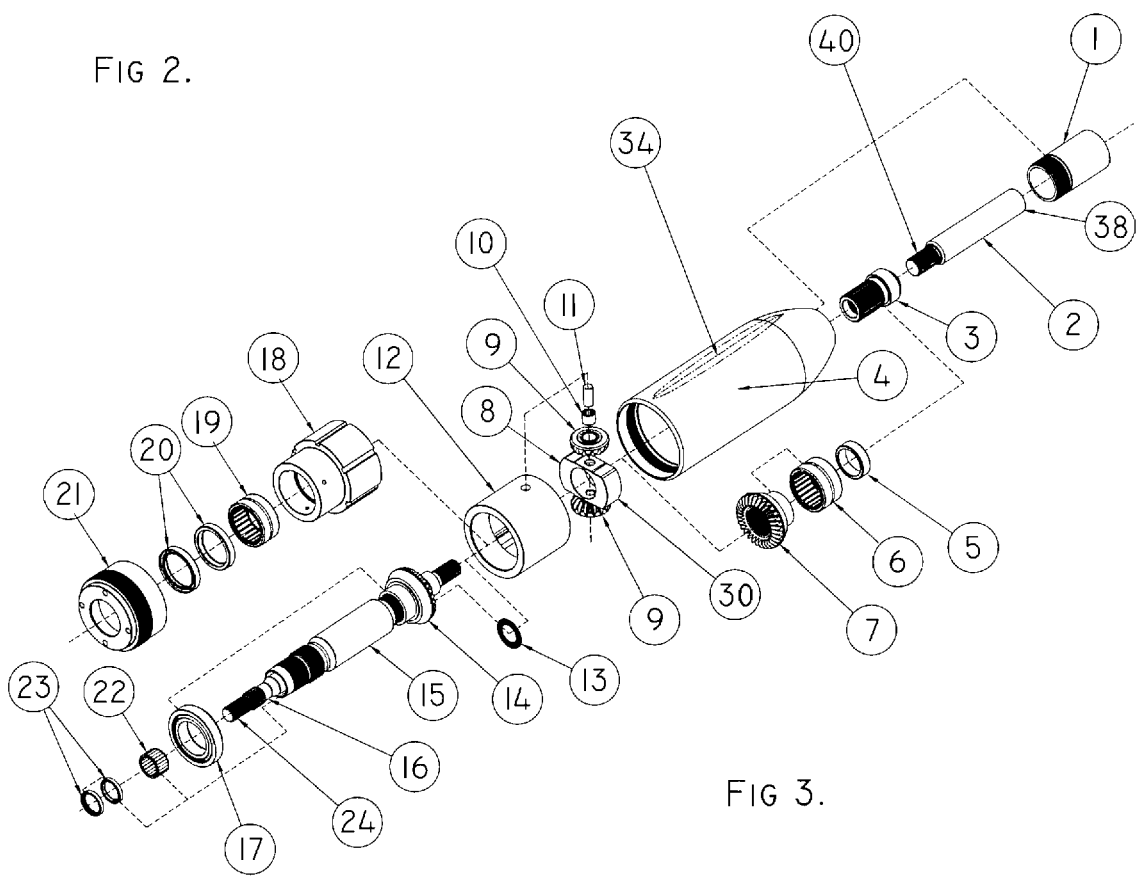
FIG. 3 is an exploded view of the strut mounted gear case.

In this particular application and for illustrative purposes, this specification is based on a highly efficient, enclosed, fully oil lubricated system that is widely available on the pleasure market. This approach is considered the best and simplest approach to adding a counter rotation gear case, but is not limited to this configuration; it can also be used with conventional exposed shaft systems or any conventional shaft application. The system can also be used with a shroud around the propellers, thereby creating a thrustor, making it a good high thrust system for commercial use. The shroud can also pivot and provide steerage.

Referring now to the drawings, illustrated is a main input shaft (2) providing a solid shaft run from a propulsion unit (50) in a boat to a strut gear case (4). The main input shaft (2) is positioned inside an outer shaft casing (1) and coupled to the gear case with an input shaft spline adapter (3). The outer shaft casing (1) is filled with lubricant which lubricates the strut gear case (3). The input shaft (2) is supported as it enters the gear case (4) by a heavy duty needle roller bearing (6) with a support bearing inner ring (5) on an input end and a input bevel drive gear (7) on an opposite end. The Input shaft (2) terminates with the spline adapter (3) to accept the bevel drive gear (7). The bevel drive gear (7) is constructed and arranged to engage an idler gear assembly (30) consisting of two opposed and evenly spaced sets of idler gears (9) positioned perpendicular to and mating with the Bevel drive gear (7) by an idler gear cage (8), with idler gears (9) coupled to the idler gear cage (8) by idler gear shafts (11) using idler gear bearings (10) to allow rotation. Idler gears (9), bearings (10), and idler gear shafts (11) are positioned by the Idler gear cage (8).

The idler gear cage assembly (30) is positioned within idler assembly carrier (12) within the gear case (4) using either a pin, key or otherwise mechanically located in a manner sufficient to hold the idler assembly carrier (12) stationary to the gear case (4). A counter shaft (15) is centered on the inner tail shaft (16) and thrusts against a forward needle thrust bearing (13). The thrust bearing (13) is against the nose of the counter shaft (15) ahead of a driven bevel gear (14) located and mechanically fixed at the forward end of the counter shaft (15). Thrust is in turn delivered through a tail shaft collar 13a which is directly coupled through the shaft adapter (3) and input shaft (2). In this manner all forward thrust from both shafts is delivered up the main Input shaft (2) to the thrust bearings inside the vessel as would be the case with any traditional fixed shaft system.

The counter shaft driven bevel gear (14) in turn meshes with the two idler gears (9) in the idler gear assembly (30) which are driven by the input bevel drive gear (7). The counter shaft (15) is supported and kept aligned to the gear case (4) by the counter shaft needle support bearing (19).

The propeller end (24) of the inner tail shaft (16) is supported within the counter shaft (15) by a tail shaft needle support bearing (22). The tail shaft (16) is retained in position at the forward end under reverse thrust by a machined part of the shaft forming a collar (13a) which bears against the counter shaft needle thrust bearing (13) and thereby the forward nose of the counter shaft (15). The counter shaft (15) is retained in position at the driven bevel gear (14) by the reverse taper thrust bearing (17), the reverse thrust collar (18) and seal plate (21).

The seal plate (21) is male threaded on the outer surface so as to mate with corresponding female threads machined inside the end of the gear case (4). The seal plate (21) is sealed to the gear case with an O-ring behind the outside thread (not shown). The reverse thrust collar houses the outer race or cup of the tapered reverse thrust bearing (17) as well as the counter shaft needle support bearing (19). The seal plate (21) houses the two rubber lip style oil and water seals (20) sealing the main gear case (4) to the counter shaft (15).

The counter shaft (15) houses the tail shaft support bearing (22) and the two rubber lip style oil and water seals (23). All reverse thrust applied is captured by the input shaft casing (1) and delivered to the shaft mounting system within the vessel itself. No thrust in either direction would be transferred to the shaft strut bracket or its mounting system. Achieving counter rotation at the strut gear case allows for a very simple and compact gear train within the gear case itself.

Common bevel or miter gears can be used, by driving the beveled counter shaft gear through intermediate idler gears produces a differential type gear cluster which by nature reverses the direction of rotation in the counter shaft from the input shaft as long as the idler gear carrier assembly is held fixed. This approach also allows the inclusion of two or more identical idler gears, the total gear train power capacity increasing by the number of idler gears sharing the load applied without changing the size of the driver/driven gears. This system will increase the overall propulsive efficiency by at least 20% over conventional systems as well as over the previously described Outdrive, Pod or outboard versions.

The strut mounted gear box for counter rotating propellers comprising: a gear box (4), said gear box (4) having a conical shaped housing with a strut (32) extending from a side surface (34), said strut (32) secured to the hull (36) of a boat; a main input shaft (2) having a proximal end (38) coupled to a propulsion component (50) and a distal end (40) secured to a idler gear cage assembly (30) located within said gear box (4), said main input shaft (2) for transferring torque and rotation from the propulsion component (50) to the idler gear cage assembly (30); a inner tail shaft (16) coupled to said main input shaft (2) arranged to rotate said inner tail shaft (16) in a first direction; a counter shaft (15) coupled to said idler gear cage assembly (30) constructed and arranged to rotate said counter shaft (15) in a second direction; a first propeller (60) secured to said inner tail shaft (16) providing rotation in the first direction; and a second propeller (62) secured to the counter shaft (15) having rotation in the second direction.

It is to be understood that while a certain form of the invention is illustrated, it is not to be limited to the specific form or arrangement herein described and shown. It will be apparent to those skilled in the art that various changes may be made without departing from the scope of the invention, and that the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A strut mounted gear box for counter rotating propellers comprising:
    a gear box (4), said gear box (4) having a conical shaped housing with a strut (32) extending from a side surface (34), said strut (32) secured to a hull (36) of a boat;
    a main input shaft (2) having a proximal end (38) coupled to a propulsion component (50) and a distal end (40) secured to a idler gear cage assembly (30) located within said gear box (4), said main input shaft (2) for transferring torque and rotation from the propulsion component (50) to the idler gear cage assembly (30);
    an outer shaft casing (1) coupled to said gear box (4), said main input shaft (2) postioned within said outer shaft casing (1), said outer shaft casing filled with a lubricant;
    a inner tail shaft (16) coupled to said main input shaft (2) arranged to rotate said inner tail shaft (16) in a first direction;
    a counter shaft (15) coupled to said idler gear cage assembly (30) constructed and arranged to rotate said counter shaft (15) in a second direction;
    a first propeller (60) secured to said inner tail shaft (16) providing rotation in the first direction; and a second propeller (62) secured to the counter shaft (15) having rotation in the second direction.

2. The strut mounted gear box for counter rotating propellers according to claim 1 wherein said first direction is clockwise and said second direction is counter-clockwise.

3. The strut mounted gear box for counter rotating propellers according to claim 1 wherein said first direction is counter-clockwise and said second direction is clockwise.

4. The strut mounted gear box for counter rotating propellers according to claim 1 wherein a bevel gear is attached to said distal end of said main input shaft, said bevel gear engaging spaced apart idler gears of said idler gear cage assembly, said spaced apart idler gears engaging a counter shaft driven bevel gear to allow counter rotation of said counter shaft.

5. The strut mounted gear box for counter rotating propellers according to claim 4 wherein idler gears are spaced apart by an Idler gear cage, said idler gear cage secured to a idler assembly carrier and held stationary within said gear box.

6. The strut mounted gear box for counter rotating propellers according to claim 1 wherein said counter shaft is centered on said inner tail shaft and thrusts against a forward needle thrust bearing.

7. The strut mounted gear box for counter rotating propellers according to claim 1 wherein thrust is delivered through a tail shaft collar which is directly coupled through a shaft adapter to said input shaft.

* * * * *